United States Patent [19]

Cragg

[11] 3,955,639
[45] May 11, 1976

[54] WHEEL CHAIRS

[75] Inventor: Harold Cragg, Birmingham, England

[73] Assignee: The Spastics Society, London, England

[22] Filed: Dec. 4, 1974

[21] Appl. No.: 529,561

Related U.S. Application Data

[62] Division of Ser. No. 308,790, Nov. 22, 1972, Pat. No. 3,901,337.

[30] Foreign Application Priority Data

Nov. 24, 1971 United Kingdom............... 54518/71

[52] U.S. Cl. ............................... 180/6.5; 180/65 F; 180/DIG. 3
[51] Int. Cl.² ......................................... B62D 11/04
[58] Field of Search ................. 180/6.5, 19 R, 65 R, 180/65 F, 66 F, 56, 58, 59, 60, 11, 25 R, 27, DIG. 3

[56] References Cited
UNITED STATES PATENTS

| | | | |
|---|---|---|---|
| 2,973,823 | 3/1961 | Stentz | 180/11 |
| 3,254,734 | 6/1966 | Behrmann | 180/19 X |
| 3,387,681 | 6/1968 | Rabjohn | 180/65 X |
| 3,613,813 | 10/1971 | Biddle | 180/6.5 |

*Primary Examiner*—Robert R. Song
*Assistant Examiner*—John A. Pekar
*Attorney, Agent, or Firm*—Imirie, Smiley & Linn

[57] ABSTRACT

A wheel chair having electric driving means arranged to drive the rear wheels of the chair, each rear wheel and its associated electric driving means is supported by a wheel plate connected to the wheel chair frame by a resilient mounting embodying a suspension media providing independent suspension for the rear wheels. The electric driving means comprises one electric motor for each rear wheel with drive transmission to the associated wheel.

5 Claims, 6 Drawing Figures

WHEEL CHAIRS

CROSS REFERENCE TO RELATED APPLICATION

This is a division of application Ser. No. 308,790 filed Nov. 22, 1972, now U.S. Pat. No. 3,901,337, issued Aug. 26, 1975.

BACKGROUND OF THE INVENTION

This invention is concerned with improvements in or relating to a wheel chair embodying electric driving means.

Many different forms of electric driving means for wheel chairs have already been proposed and certain proposals have been used. Many forms of electric drive now in use embody power transmissions including belts. Because of various factors, such belts can be hazardous to invalid users, and in fact the use of power driven wheel chairs with belt transmission is precluded in certain countries. To avoid this problem there have been various proposals to provide a direct form of drive transmission from an electric motor instead of belts. However, these proposals have not been acceptable because the wheel chairs have been so cumbersome, bulky and heavy, or the driving arrangement has been so complicated and such that when a power failure or other fault has developed, it has not been possible for the wheel chair to be manually propelled either by the invalid or an ambulant person.

SUMMARY OF THE INVENTION

An object of this invention is to provide an improved form of wheel chair having electric driving means attempts to overcome the foregoing disadvantages, and to provide a simple, inexpensive arrangement with adequate versatility for use with different designs of wheel chairs.

According to this invention, I provide an electrically driven wheel chair comprising a foldable frame supported on two pairs of wheels, the rear pair of said wheels being independently driven by electric driving means comprising an electric motor for each wheel of said rear pair, and battery power means connected to said electric motor through operable control means, a pair of wheel plates each supporting one of said rear wheels and said electric motor associated therewith, mounting means connected to said frame and mounting one of said wheel plates for resilient movement of said one wheel plate together with said one rear wheel supported thereon independent of said frame.

Accordingly, this invention provides independent suspension on the two rear wheels of an electrically driven wheelchair.

In order that this invention be understood clearly, an exemplary embodiment of a wheel chair including electric driving means in accordance with this invention is depicted in the accompanying drawings.

DESCRIPTION OF THE PREFERRED EMBODIMENT

Figure 1:
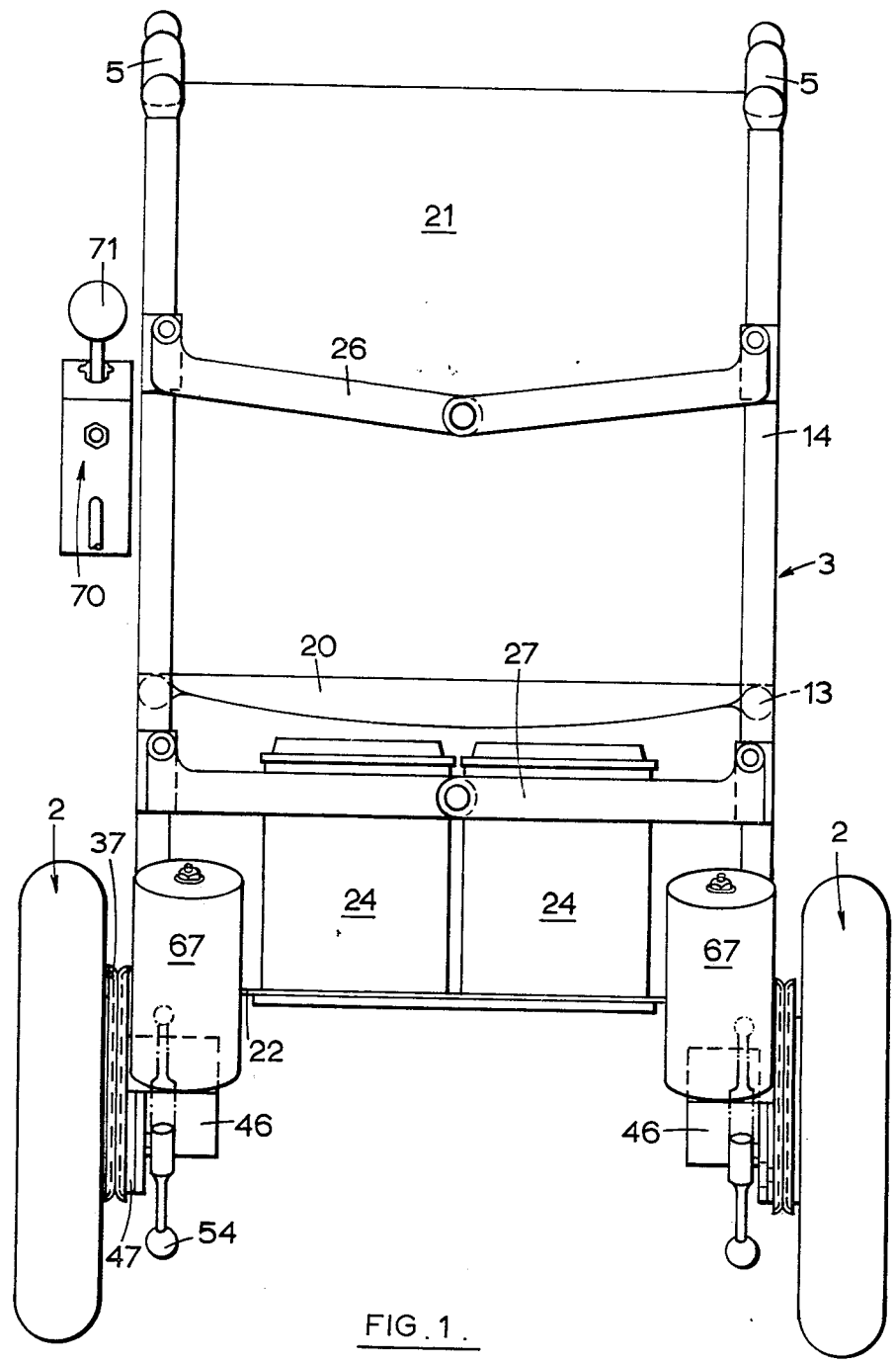
FIG. 1 is a rear view of the wheel chair according to the present invention.
Figure 2:
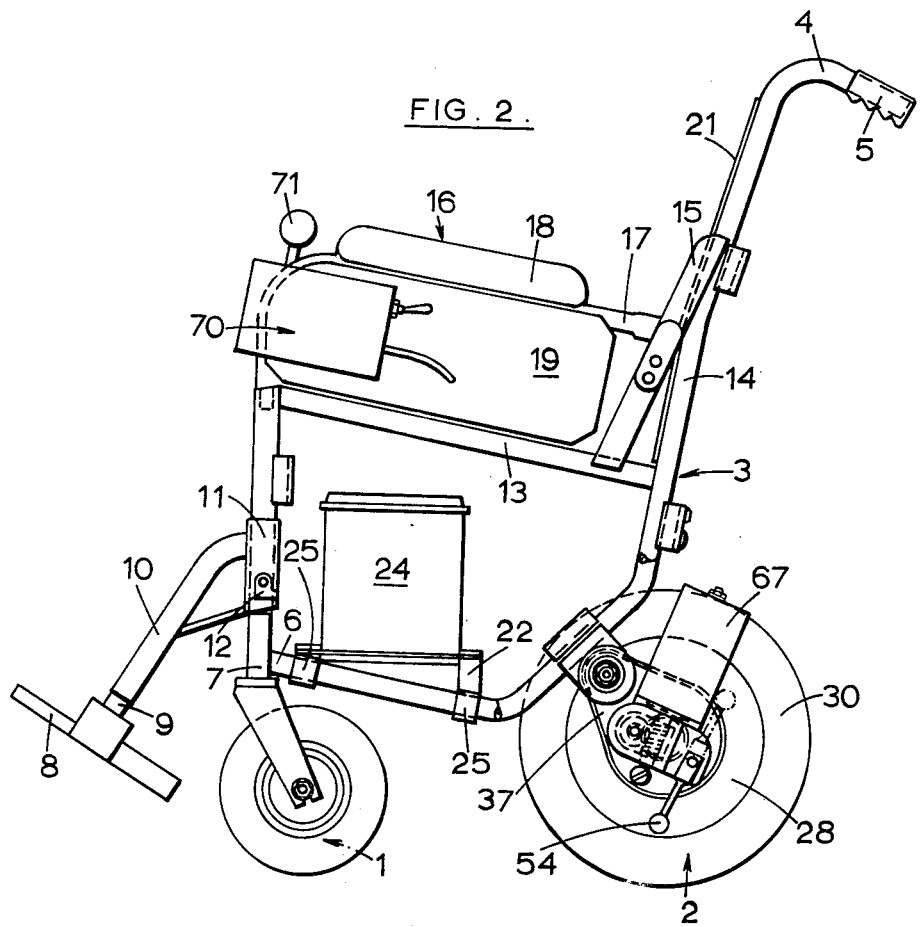
FIG. 2 is a side view of the wheel chair with the near-side wheel and associated driving means being omitted for clarity.
Figure 3:
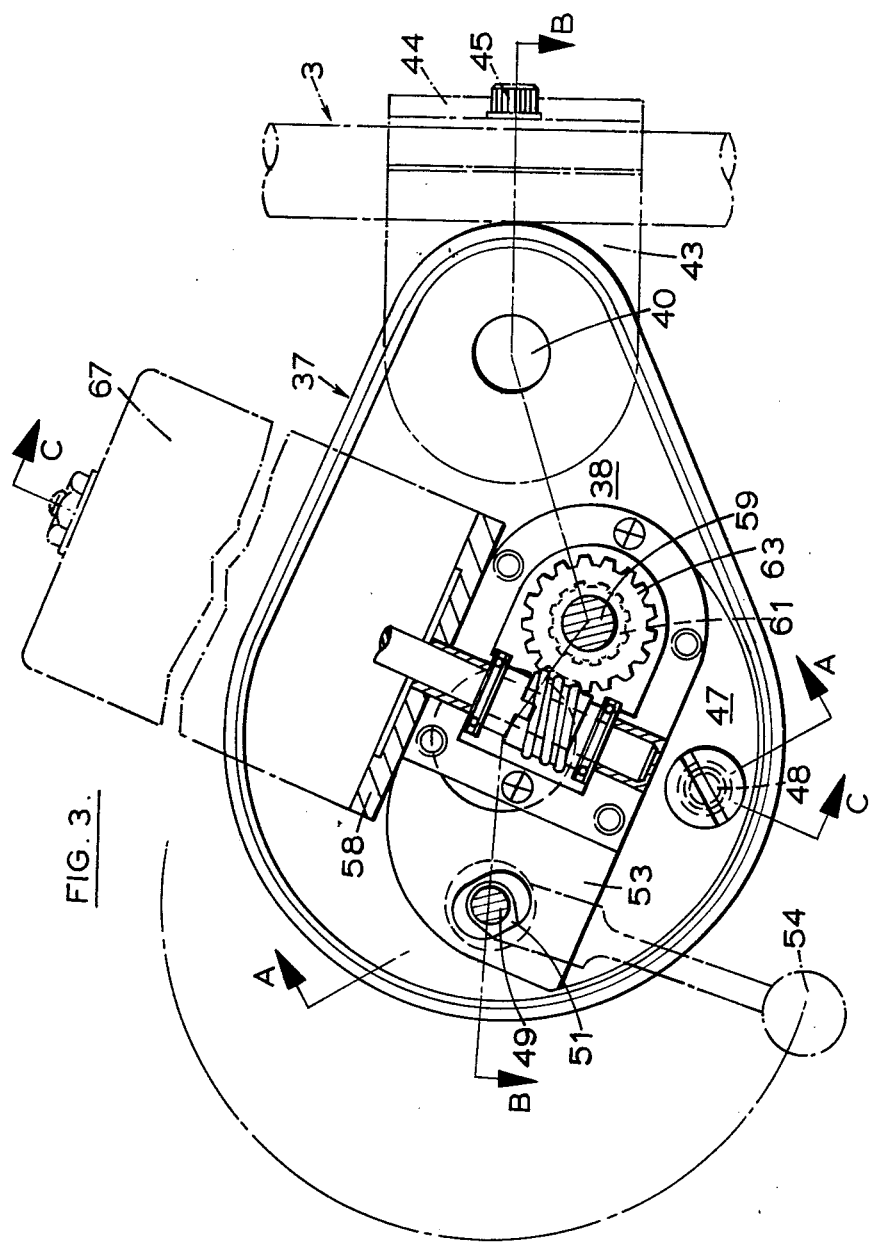
FIG. 3 is an enlarged detail view of the driving means depicted in FIG. 2 with certain parts omitted for clarity.
Figure 4:
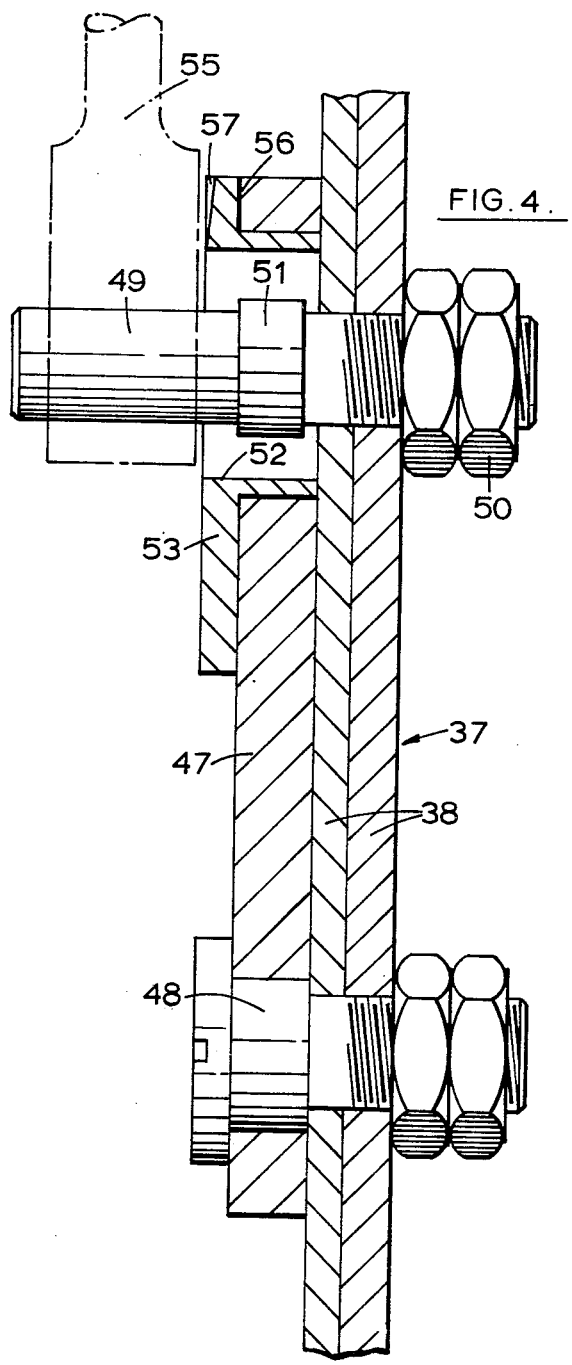
FIG. 4 is an enlarged section on line A—A of FIG. 3.
Figure 5:
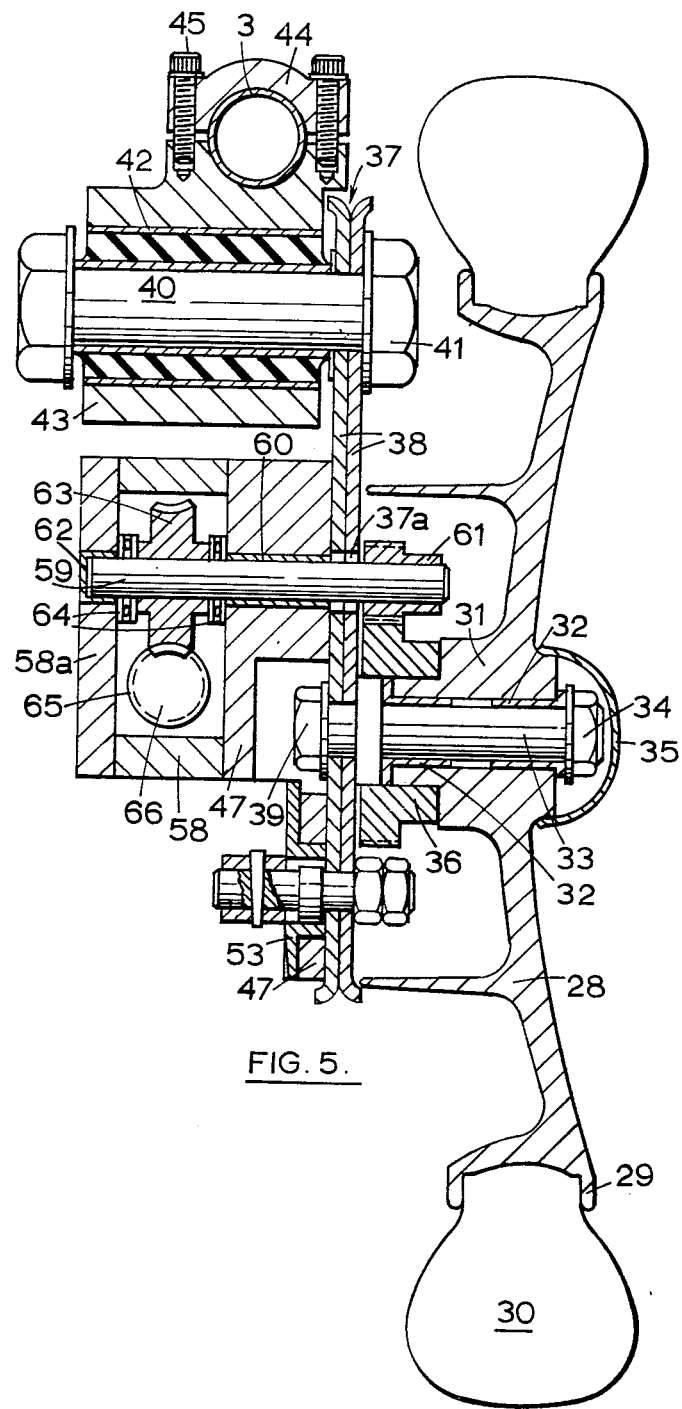
FIG. 5 is a section on line B—B of FIG. 3 and including the wheel.
Figure 6:
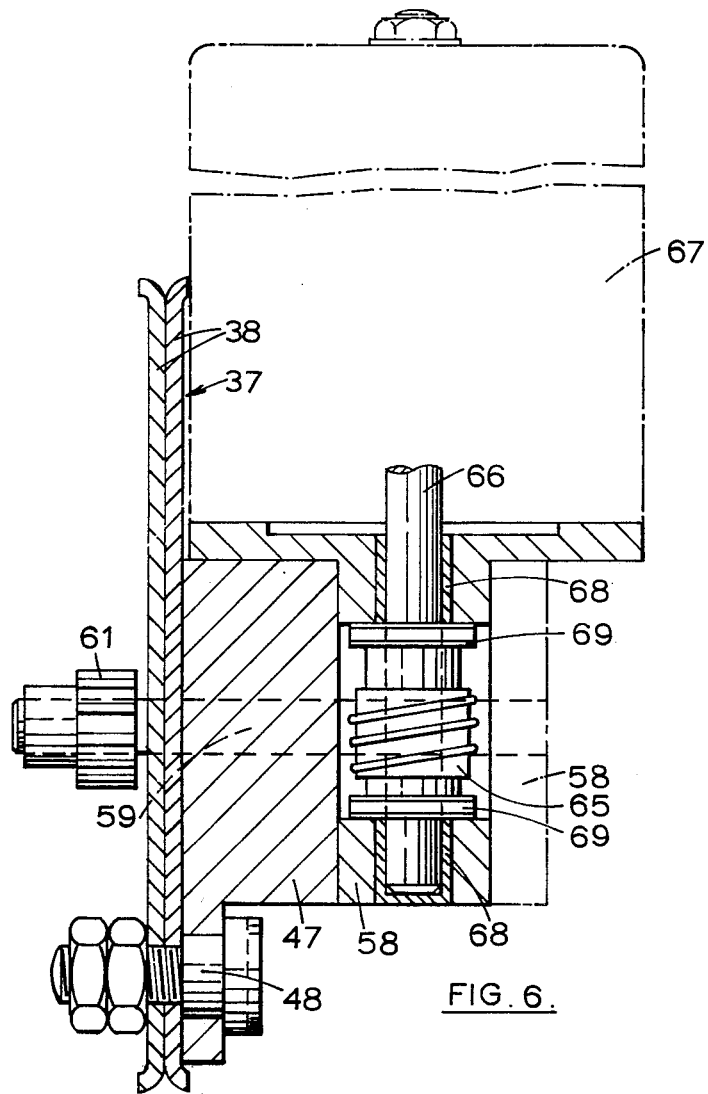
FIG. 6 is a section on line C—C of FIG. 3.

With reference to the accompanying drawings the wheel chair comprises a tubular, foldable frame made principally of a light alloy supported on a pair of front castor wheels 1 and a pair of rear wheels 2 driven by the electric driving means according to this invention.

The frame comprises two main members 3 each of substantially L-shape having a rearwardly inclined upper handle portion 4 covered by a hand-grip 5 by means of which the wheel chair may be propelled manually. The lower end portion 6 of each main member is rigidly connected to the lower end of one of two front members 7 extending substantially vertical and carrying one of the castor wheels 1. Each front member 7 detachably carries a foot-rest 8 which is mounted on a stem 9 adjustably received within one end of a footrest hanger 10, the other end of the hanger being connected to a channel-shaped bracket 11 which embraces the front member 7 and is releasably locked thereto by a pin and slot connection 12.

One of two seat support members 13 is fixed to the upper end of one of the front members 7 and the upstanding part 14 of the associated main member so that the seat support members extend substantially slightly downwardly and rearwardly inclined to the horizontal. Each seat support member 13 is also connected to the upstanding part 14 of the associated main member by a strut or link 15 and one of a pair of detachable arm rests 16 releasably engages with the strut 15 and a fixing such as a socket provided on the upper end of the associated front member. The arm rest 16 comprises a tubular L-shape element 17 carrying an elongated cushion 18 and a modesty panel 19.

A seat panel 20 of a flexible material extends between the two seat support members 13 and a similar back-rest panel 21 extends between the upstanding parts 14 of the two main members.

A carrier 22 supporting two 12 volt batteries 24 extends between the lower parts 6 of the two main members and is detachably mounted therefrom by opposed pairs of open sided brackets 25 only partially embracing the respective parts of the two main members so that the carrier 22 may be lifted for removal when the wheel chair is to be folded.

The upstanding parts 14 of the two main members are connected together by upper and lower hinged links 26, 27 and the two front members 7 are also connected by a hinged assembly including two pairs of links (not shown). When the battery carrier 22 is removed these links enable the wheel chair to be folded with the two main members 3 being disposed side-by-side. Preferably, at least one of the links is arranged to maintain the wheel chair in the operative position (as shown) and to retain it against such folding movement when in use. This may be provided by a double link assembly in which the hinges permit the links being pivotted to an over-centre locked position, alternatively an interlocking or manual fastening may be provided.

Each rear wheel 2 comprises a cast body 28 providing an annular rim 29 supporting a pneumatic tyre 30. The body 28 has an inner concentric boss 31 with internal flanged sleeve bushings 32. A wheel spindle 33 extends through the bushing 32 and carries a locking nut 34 on its outer end for releasably securing the wheel on the spindle. The locking nut 34 is covered by a dust cap 35 secured to the wheel boss. Preferably, the bushing 32 is made from a low-friction plastics material. The inner end of the boss carries a fixed drive pinion 36 concentric with the wheel spindle 33.

Each rear wheel is carried from the associated main member by a wheel plate assembly 37 comprising a pair of lipped steel pressings 38 of elliptical shape welded back-to-back. Alternatively, the wheel plate may comprise a single thick plate carrying a lipped, relatively thin plate serving as a dust and dirt excluder. The inner end of the wheel spindle 33 extends through a piercing in the wheel plate 37 and a nut 39 secures the spindle 33 and wheel thereto.

The narrow end of the wheel plate 37 has a further piercing through which one end of a resiliently mounted suspension pin 40 extends with a nut 41 on the protruding end of the pin securing the pin 40 and wheel plate 37 together against relative movement. The pin 37 is connected to a rubber bonded bushing 42, such as sold under the Trade Mark METALASTIK, and this is seated within a bore in a bracket casting 43. The bracket casting 43 is formed with a part cylindrical groove extending normal to the bore and the elbow of main member 3 is received within the groove and clamped therein by a complementary bracket part 44 secured to the bracket casting by bolts 45.

As will be understood the resiliently mounted suspension pin 40 provides a support carrying the wheel plate 37 and wheel whilst permitting limited resilient springing movement of the wheel relative to the wheel chair frame. As each rear wheel is independently mounted, the rear of the wheel chair has a spring suspension which reduces discomfort to the occupant and increases stability of the wheel chair during movement.

A gear box 46 for transmitting drive to the wheel pinion 36 comprises a support plate 47 by which the gear box is pivotally mounted on the wheel plate 37 through a stepped pivot pin 48 extending through a piercing in the wheel plate 37. The pivot axis of the support plate 47 is parallel to the wheel spindle axis but disposed below and forwardly thereof.

A cam shaft 49 is mounted in a further piercing in the wheel plate 37 and secured by nuts 50 to the wheel plate for relative rotational movement. The pivot axis of the cam shaft 49 is parallel to the wheel spindle axis but extends in the plate containing the axes of the wheel spindle and the suspension pin. The cam shaft 49 carries a fixed single lobe cam 51 which is seated within an elongated recess 52 in a hardened steel cam plate 53 tightly housed within an aperture in the back plate 47. The cam shaft 49 has an operating handle 54 pinned thereto. The spindle 54 has a flat sided boss 55 of which the face adjacent the cam plate is adapted to engage with the adjacent face of a peripheral flange 56 of the cam plate to clamp the support plate 47 and the wheel plate 37 together against relative pivotal movement when the handle is in either extreme operative positions. The adjacent face of the flange is provided with a taper 57 which extending circumferentially relative to the can shaft axis fpr about 180° so that between the extreme operative positions of the handle 54, the boss 55 does not apply clamping pressure to the support plate 47 and relative pivotal movement may occur.

The gear box 46 further comprises a motor plate 58 and a cover plate 58a. A shaft 59 is mounted for rotation in a bushing 60 seated within a bore in the support plate 47. The shaft axis extends parallel to the axis of the wheel spindle but is offset therefrom and the end of the shaft nearest the wheel protrudes from the housing and through a slot 37a in the wheel plate 37. Said end carries a driven pinion 61 which is arranged to mesh with the drive pinion 36 on the wheel hub when the drive is operative as shown. The other end of the shaft 59 is received within a bush 62 in a closed bore in the cover plate 58a and adjacent to this end the shaft 59 carries a worm wheel 63 mounted between two thrust races 64 and rotatable within the shaft.

The worm wheel 63 is engaged with a worm 65 carried on the end of a drive shaft 66 of an electric motor 67. The drive shaft 66 is rotatably mounted in the housing by pairs of bushings 68 and thrust races 69 between which the worm 65 is located for rotation with the drive shaft 66. The motor 67 is rigidly mounted in the motor plate 58.

The electric motors 67 are each independently connected to a pair of batteries 34 connected in series through a manually operable progressive control unit 70. Such control unit may be of any suitable known kind whereby a control handle 71 may be manipulated from a neutral control stop position to a forward or rearward position with the distance of the movement of the handle being proportional to the power output to the motor to control the speed thereof. The control handle 71 also may be moved from one side or the other to control turning movement. In this invented wheel chair as the electric motors are independent then the movement of the control handle 71 to one side is arranged to provide forward driving to one motor and reverse driving to the other motor so that very small turning circles or arcs may be achieved. However, any similar form of control unit could be utilised. Of course the control unit includes an on/off switch and the wiring harness (not shown) includes any suitable means for electrically connecting the batteries to a charging unit of suitable type.

In use of the aforedescribed wheel chair when the driving means is operative the two operating handles 54 are in the raised position, and the wheel plate 37 and the support plate 47 are clamped together against relative pivotal movement. The drive pinion 36 is engaged by the driven pinion 61 and by the manual operation of the control unit the wheel chair may be driven on the appropriate driving of the electric motors.

To render the driving means inoperative, the operating handles 54 are rotated through approximately 180° and this rotates the cams 51 which are respectively engaged with their cam plates. The engagement of each cam and cam plate is arranged so that when the cam is rotated through approximately 180°, the back plate 47 carrying the gear box is pivotted about the pivot pin 48 to angularly displace the support plate 47 relative to the wheel plate 37. On reaching the extreme position the respective wheel plate 37 and the support plates 47 are clamped together again the two plates being unclamped whilst the handle is rotated to permit such pivotal movement. On such pivotal displacement of the support plate the driven pinion 61 is disengaaged from the fixed drive pinion 36 and there is no connection between the wheel and the driving means. Accordingly the wheel chair may be manually advanced in the conventional manner, and as the driving means is completely disconnected an ambulant pusher or the chair occupant does not have to utilise any excessive effort to propel the chair despite the fact that the wheel chair embodies electric driving means.

It is envisaged that this invention could be utilised with wheel chairs having alternative forms and constructions of frames.

It is also envisaged that the electric driving means may comprise an assembly of a wheel complete with motor gear box and suspension mounting and other associated parts which could be fitted to an existing wheel chair frame instead of one of the original rear wheels.

Other alternatives and modifications for special applications will be apparent to those skilled in this field, but the advantages of this invention will be obvious especially in view of the compactness, versatility and simplicity herein mentioned.

What is claimed is:

1. An electrically driven wheel chair comprising a foldable frame supported on two pairs of wheels, the rear pair of said wheels being independently driven by electric driving means comprising an electric motor for each wheel of said rear pair; and battery power means connected to said electric motor through operable control means, a pair of wheel plates each supporting one of said rear wheels and said electric motor associated therewith, mounting means connected to said frame and mounting independently each one of said wheel plates for pivotal resilient movement of each of said wheel plates together with said rear wheel supported thereon about a horizontal axis inependent of said frame.

2. A wheelchair according to claim 1 wherein said mounting means comprises for each wheel plate a bracket connected to a member of said foldable frame, a bushing mounted in said bracket, a resilient media incorporated in said bushing, a suspension pin connected to said wheel plate and horizontaly mounted in said bushing.

3. A wheelchair according to claim 2 wherein said bracket includes a first part mounting said bushing, a second part connected to said first part by bolt means with the said frame member being clamped between said first and second parts.

4. A wheelchair according to claim 1 wherein said foldable frame comprises two main frame members connected together by foldable links and flexible seat and back panels extending between said two main frame members, one of said two main frame members carrying an arm rest, said control means being mounted adjacent said arm rest.

5. A wheelchair according to claim 1 wherein each one said electric motor is coupled to a respective drive transmitting means including a driven pinion, a fixed pinion carried on each said wheel plate associated with each said electric motor, said driven and fixed pinions being interengaged for driving rotation of said rear wheel associated with each wheel plate.

* * * * *